US012755350B2

(12) United States Patent
Wang et al.

(10) Patent No.: US 12,755,350 B2
(45) Date of Patent: Oct. 6, 2026

(54) ENHANCEMENT OF IMAGE RESOLUTION TO SUBPIXEL LEVEL WITH NEAREST NEIGHBOR PIXEL DECONVOLUTION (NNPD)

(71) Applicant: Raytheon Company, Tewksbury, MA (US)

(72) Inventors: Yu Wang, Tucson, AZ (US); Dave S. Douglas, Marana, AZ (US); Jonathan Aaron Cain, Tucson, AZ (US); Mark S. Smith, Tucson, AZ (US); Patrick O. Kano, Tucson, AZ (US)

(73) Assignee: Raytheon Company, Arlington, VA (US)

( * ) Notice: Subject to any disclaimer, the term of this patent is extended or adjusted under 35 U.S.C. 154(b) by 190 days.

(21) Appl. No.: 18/887,948

(22) Filed: Sep. 17, 2024

(65) Prior Publication Data

US 2026/0080514 A1 Mar. 19, 2026

(51) Int. Cl.
*G06T 5/70* (2024.01)
*G06T 3/40* (2006.01)

(52) U.S. Cl.
CPC .................. *G06T 5/70* (2024.01); *G06T 3/40* (2013.01); *G06T 2207/20172* (2013.01)

(58) Field of Classification Search
CPC ... G06T 5/70; G06T 3/40; G06T 2207/20172; G06T 3/4053; G06T 5/20; G06T 5/73
See application file for complete search history.

(56) References Cited

U.S. PATENT DOCUMENTS

| | | | | |
|---|---|---|---|---|
| 7,912,307 | B2 | 3/2011 | Wang | |
| 8,018,476 | B2 | 9/2011 | Credelle et al. | |
| 8,022,969 | B2 | 9/2011 | Elliott | |
| 8,223,168 | B2 | 7/2012 | Brown Elliott et al. | |
| 8,669,524 | B2 * | 3/2014 | Lifshin | H01J 37/28 250/311 |
| 8,704,847 | B2 | 4/2014 | Higgins et al. | |
| 8,780,133 | B2 | 7/2014 | Jeong et al. | |
| 10,606,055 | B2 * | 3/2020 | Horstmeyer | G01T 1/185 |
| 10,679,763 | B2 * | 6/2020 | Zheng | G06V 20/693 |
| 11,688,039 | B2 * | 6/2023 | Shu | G06T 3/4076 382/299 |
| 2012/0287148 | A1 | 11/2012 | Elliot | |
| 2018/0196194 | A1 | 7/2018 | Fattal | |
| 2022/0270211 | A1 * | 8/2022 | Kusumi | H04N 25/61 |
| 2023/0260743 | A1 * | 8/2023 | Zhang | H01J 37/222 250/311 |

OTHER PUBLICATIONS

Wang et al., "Enhance image resolution with nearest neighbor pixel deconvolution", Advanced Optics for Imaging Applications: UV through LWIR IV, May 2019, 9 pages.
Wang et al., "Reduced noise and ringing for image processing," SIAM Workshop, 2024, 4pages.

* cited by examiner

*Primary Examiner* — Tom Y Lu

(57) ABSTRACT

A method for providing enhanced subpixel resolution includes obtaining point spread function (PSF) data associated with an input image. The method also includes determining subpixel PSF data from the PSF data. The method further includes generating a filled subpixel sparse image from pixels of the input image. In addition, the method includes applying nearest neighbor pixel deconvolution (NNPD) to the subpixel PSF data and the filled subpixel sparse image to generate an enhanced subpixel image having an increased resolution.

20 Claims, 8 Drawing Sheets

ENHANCEMENT OF IMAGE RESOLUTION TO SUBPIXEL LEVEL WITH NEAREST NEIGHBOR PIXEL DECONVOLUTION (NNPD)

TECHNICAL FIELD

This disclosure relates generally to image enhancement. More specifically, this disclosure relates to enhancement of image resolution to a subpixel level with nearest neighbor pixel deconvolution (NNPD), which is also known as neighboring-pixel-optical-transfer-function (NPOTF).

BACKGROUND

Image enhancement is often a useful or important function for astronomy, defense, or other imaging applications. For example, finer details of scenes are smaller than the sensor pixel size of an optical sensor that is capturing images of the scenes, and these finer details may not be recognized by the sensor pixels of the optical sensor. This can result in a loss of detail in the captured images.

SUMMARY

This disclosure relates to enhancement of image resolution to a subpixel level with nearest neighbor pixel deconvolution (NNPD).

In some examples, a method for providing enhanced subpixel resolution includes obtaining point spread function (PSF) data associated with an input image. The method also includes determining subpixel PSF data from the PSF data. The method further includes generating a filled subpixel sparse image from pixels of the input image. In addition, the method includes applying NNPD to the subpixel PSF data and the filled subpixel sparse image to generate an enhanced subpixel image having an increased resolution.

Any single one or any combination of the following features may be used with the examples above. Determining the subpixel PSF data may include determining a smoothing function for the PSF data and determining the subpixel PSF data for each subpixel responsive to the smoothing function. Determining the smoothing function may include determining the PSF data associated with each pixel in the input image and determining the smoothing function from the PSF data associated with each pixel. Generating the filled subpixel sparse image may include shrinking the pixels of the input image by a predetermined amount to create a subpixel sparse image and generating pixel values in portions of the subpixel sparse image having no values associated therewith. The subpixel sparse image may include a first group of pixels having values associated therewith and a second group of pixels having no values associated therewith. Generating the pixel values may include generating the pixel values responsive to a number of adjacent values having a pixel value associated therewith. Shrinking the pixels of the input image may include shrinking the pixels to 1/N×1/N (where N is a positive integer) size of an original pixel size. The method may include displaying the enhanced subpixel image having the increased resolution.

In other examples, a system for providing enhanced subpixel resolution includes an imaging system configured to capture an input image. The input image is associated with PSF data. The system also includes at least one processing device configured to obtain the input image and the PSF data, determine subpixel PSF data from the PSF data, generate a filled subpixel sparse image from pixels of the input image, and apply NNPD to the subpixel PSF data and the filled subpixel sparse image to generate an enhanced subpixel image having an increased resolution.

Any single one or any combination of the following features may be used with the examples above. The at least one processing device may be configured to determine a smoothing function for the PSF data and determine the subpixel PSF data for each subpixel responsive to the smoothing function. The at least one processing device may be configured to determine the PSF data associated with each pixel in the input image and determine the smoothing function from the PSF data associated with each pixel. The at least one processing device may be configured to shrink the pixels of the input image by a predetermined amount to create a subpixel sparse image and generate pixel values in portions of the subpixel sparse image having no values associated therewith. The subpixel sparse image may include a first group of pixels having values associated therewith and a second group of pixels having no values associated therewith. The at least one processing device may be configured to generate the pixel values responsive to a number of adjacent values having a pixel value associated therewith. The at least one processing device may be configured to shrink the pixels to 1/N×1/N size of an original pixel size. The system may include a display configured to display the enhanced subpixel image having the increased resolution.

In still other examples, a non-transitory machine readable medium contains instructions that when executed cause at least one processor to obtain PSF data associated with an input image, determine subpixel PSF data from the PSF data, generate a filled subpixel sparse image from pixels of the input image, and apply NNPD to the subpixel PSF data and the filled subpixel sparse image to generate an enhanced subpixel image having an increased resolution.

Any single one or any combination of the following features may be used with the examples above. The instructions when executed may cause the at least one processor to determine a smoothing function for the PSF data and determine the subpixel PSF data for each subpixel responsive to the smoothing function. The instructions when executed may cause the at least one processor to determine the PSF data associated with each pixel in the input image and determine the smoothing function from the PSF data associated with each pixel. The instructions when executed may cause the at least one processor to shrink the pixels of the input image by a predetermined amount to create a subpixel sparse image and generate pixel values in portions of the subpixel sparse image having no values associated therewith.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 9, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

Figure 1:
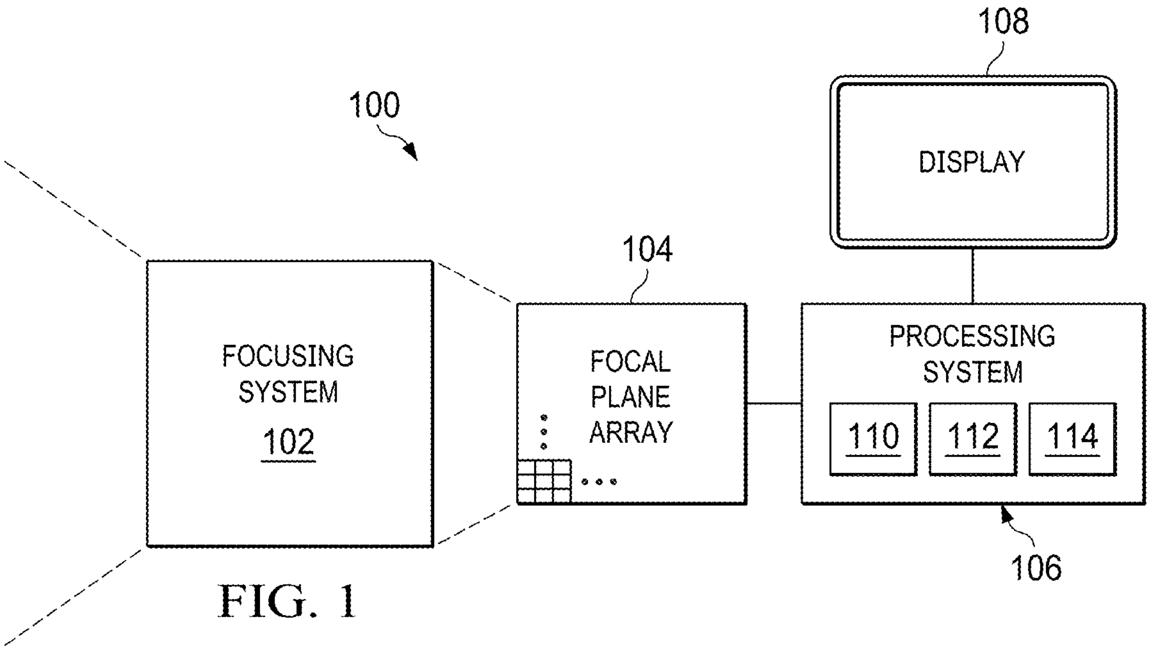
FIG. 1 illustrates an example system supporting subpixel image enhancement of digital pixels for an imaging device or other device according to this disclosure.

FIG. 1 illustrates an example system 100 supporting subpixel image enhancement of digital pixels for an imaging device or other device according to this disclosure. As shown in FIG. 1, the system 100 may include a focusing system 102, a focal plane array 104, and a processing system 106. The focusing system 102 generally operates to focus illumination from a scene onto the focal plane array 104. The focusing system 102 may have any suitable field of view that is directed onto the focal plane array 104. The focusing system 102 includes any suitable structure(s) configured to focus illumination, such as one or more lenses, mirrors, or other optical devices.

The focal plane array 104 generally operates to capture image data related to a scene. For example, the focal plane array 104 may include a matrix or other collection of pixel circuit elements that generate electrical signals representing a scene and that process the electrical signals. Several of the pixel circuit elements are shown in FIG. 1, although the size of the pixel circuit elements is exaggerated for convenience here. The focal plane array 104 may capture image data in any suitable spectrum or spectra, such as in the visible, infrared, or ultraviolet spectrum. The focal plane array 104 may also have any suitable resolution, such as when the focal plane array 104 includes a collection of approximately 1,000 pixel circuit elements by approximately 1,000 pixel circuit elements (although other collection sizes may be used). The focal plane array 104 includes any suitable collection of pixel circuit elements configured to capture image data. The focal plane array 104 may also include additional components that facilitate the receipt and output of information, such as readout integrated circuits (ROICs).

The processing system 106 receives outputs from the focal plane array 104 and processes the information. For example, the processing system 106 may process image data generated by the focal plane array 104 in order to generate visual images for presentation to one or more personnel, such as on a display 108. However, the processing system 106 may use the image data generated by the focal plane array 104 in any other suitable manner. The processing system 106 includes any suitable structure configured to process information from a focal plane array or other imaging system. For instance, the processing system 106 may include one or more processing devices 110, such as one or more microprocessors, microcontrollers, digital signal processors (DSPs), field programmable gate arrays (FPGAs), application specific integrated circuits (ASICs), or discrete logic devices. The processing system 106 may also include one or more memories 112, such as a random access memory, read only memory, hard drive, Flash memory, optical disc, or other suitable volatile or non-volatile storage device(s). The processing system 106 may further include one or more interfaces 114 that support communications with other systems or devices, such as a network interface card or a wireless transceiver facilitating communications over a wired or wireless network or a direct connection. The display 108 includes any suitable device configured to graphically present information.

Although FIG. 1 illustrates one example of a system 100 supporting subpixel image enhancement of digital pixels for an imaging device or other device, various changes may be made to FIG. 1. For example, various components in FIG. 1 may be combined, further subdivided, replicated, omitted, or rearranged and additional components may be added according to particular needs.

Figure 2:
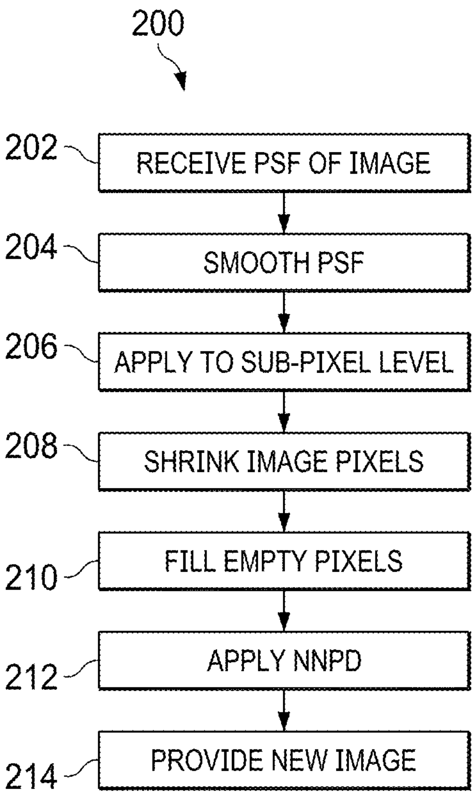
FIG. 2 illustrates an example process for applying enhanced image resolution to subpixels within image data using nearest neighbor pixel deconvolution (NNPD) according to this disclosure.

FIG. 2 illustrates an example process 200 for applying enhanced image resolution to subpixels within image data using nearest neighbor pixel deconvolution (NNPD) according to this disclosure. This process 200 can build high-resolution images at the subpixel level by processing large-pixel input images. As shown in FIG. 2, point spread function (PSF) data for an input image is received at step 202. This may include, for example, the processing system 106 obtaining the PSF data from the focal plane array 104 or other imaging system. The received PSF data is smoothed at step 204, and a smoothing function is applied at the subpixel level to determine PSF of the subpixels at step 206. This may include, for example, the processing system 106 applying the smoothing function at the subpixel level of the image data of the input image. One example of smoothing PSF data is shown in FIG. 3, which is described below.

Figure 4:
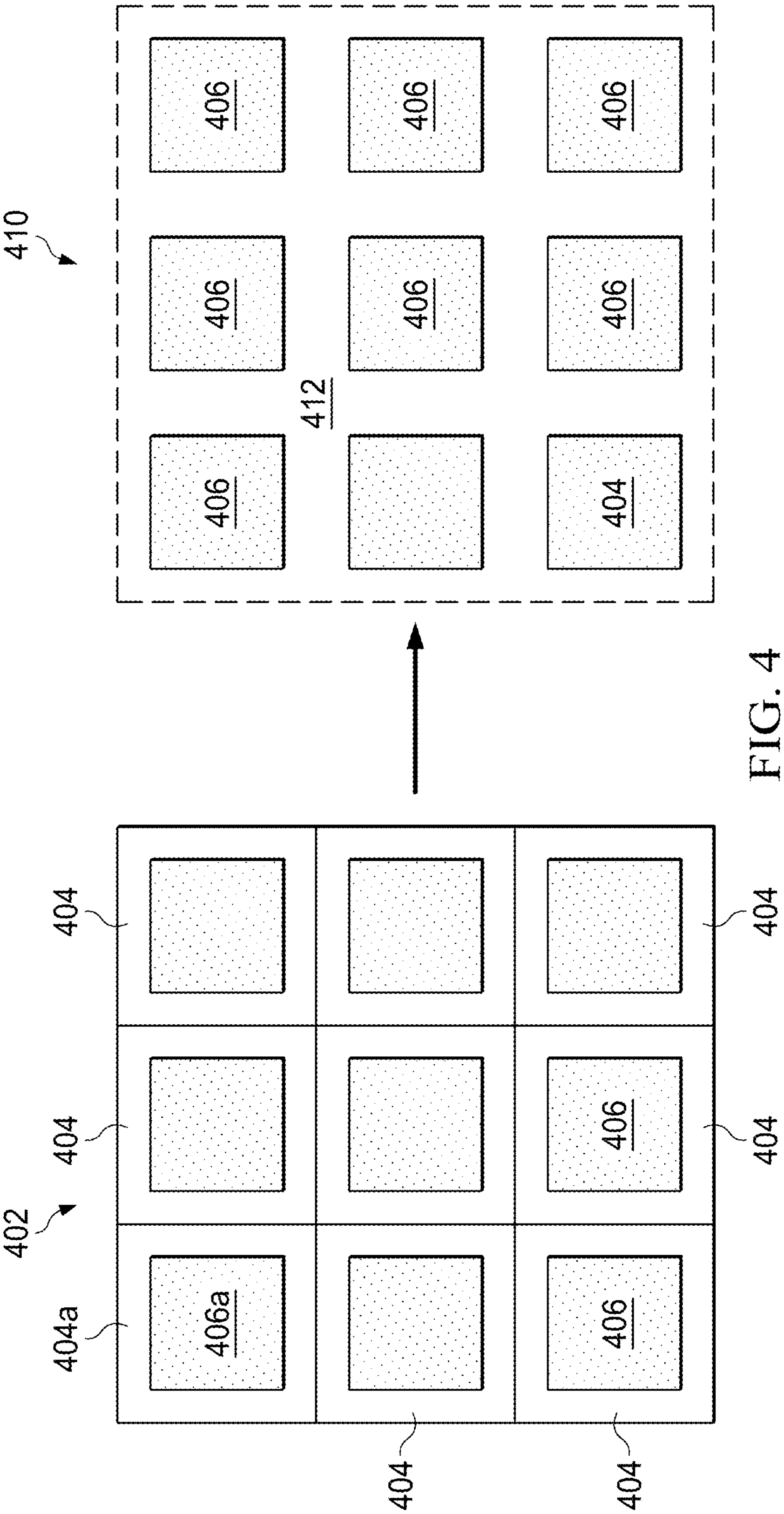
FIG. 4 illustrates an example shrinkage of image pixels to generate a sparse image according to this disclosure.
Figure 5:
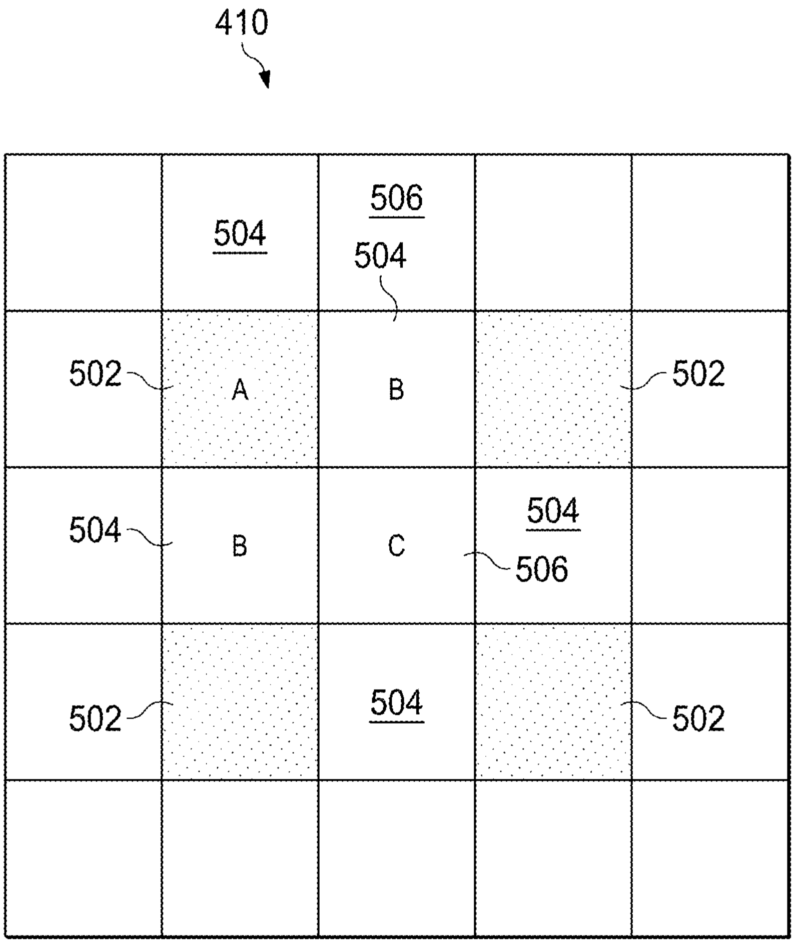
FIG. 5 illustrates an example filling of empty pixels within a sparse image according to this disclosure.
Figure 6:
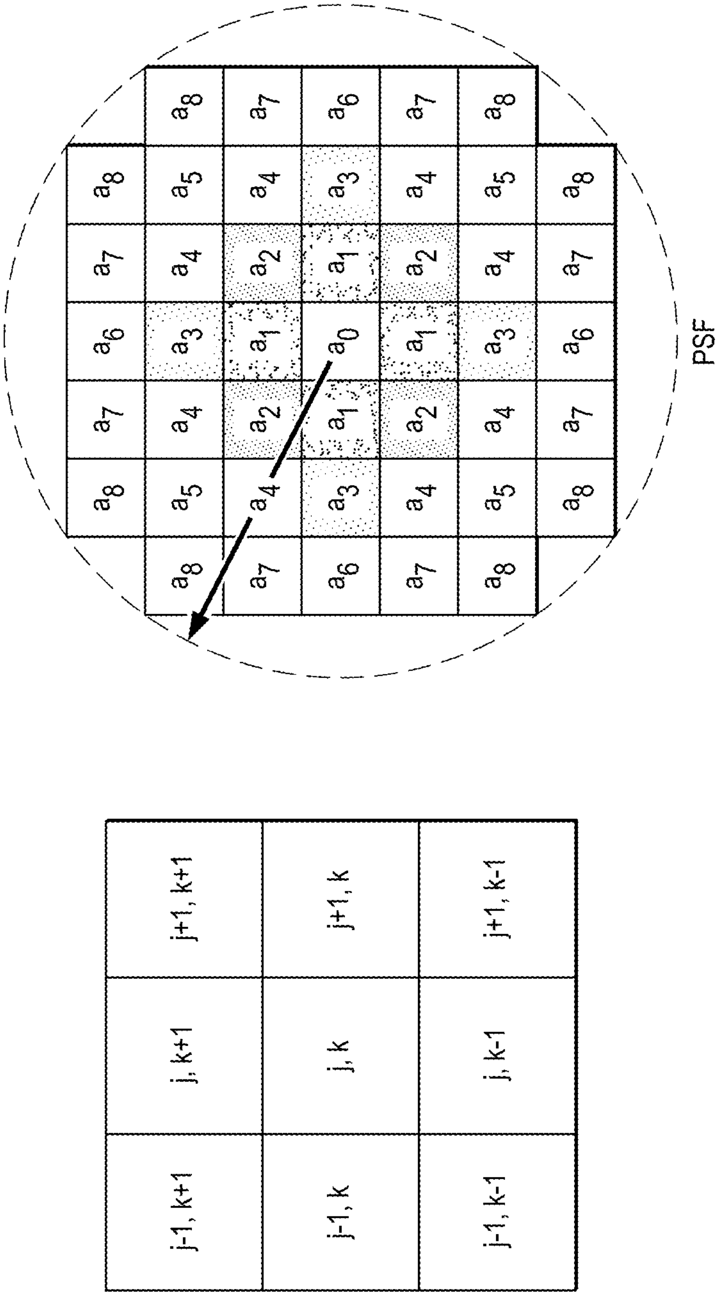
FIG. 6 illustrates an example NNPD processing technique according to this disclosure.
Figure 7:
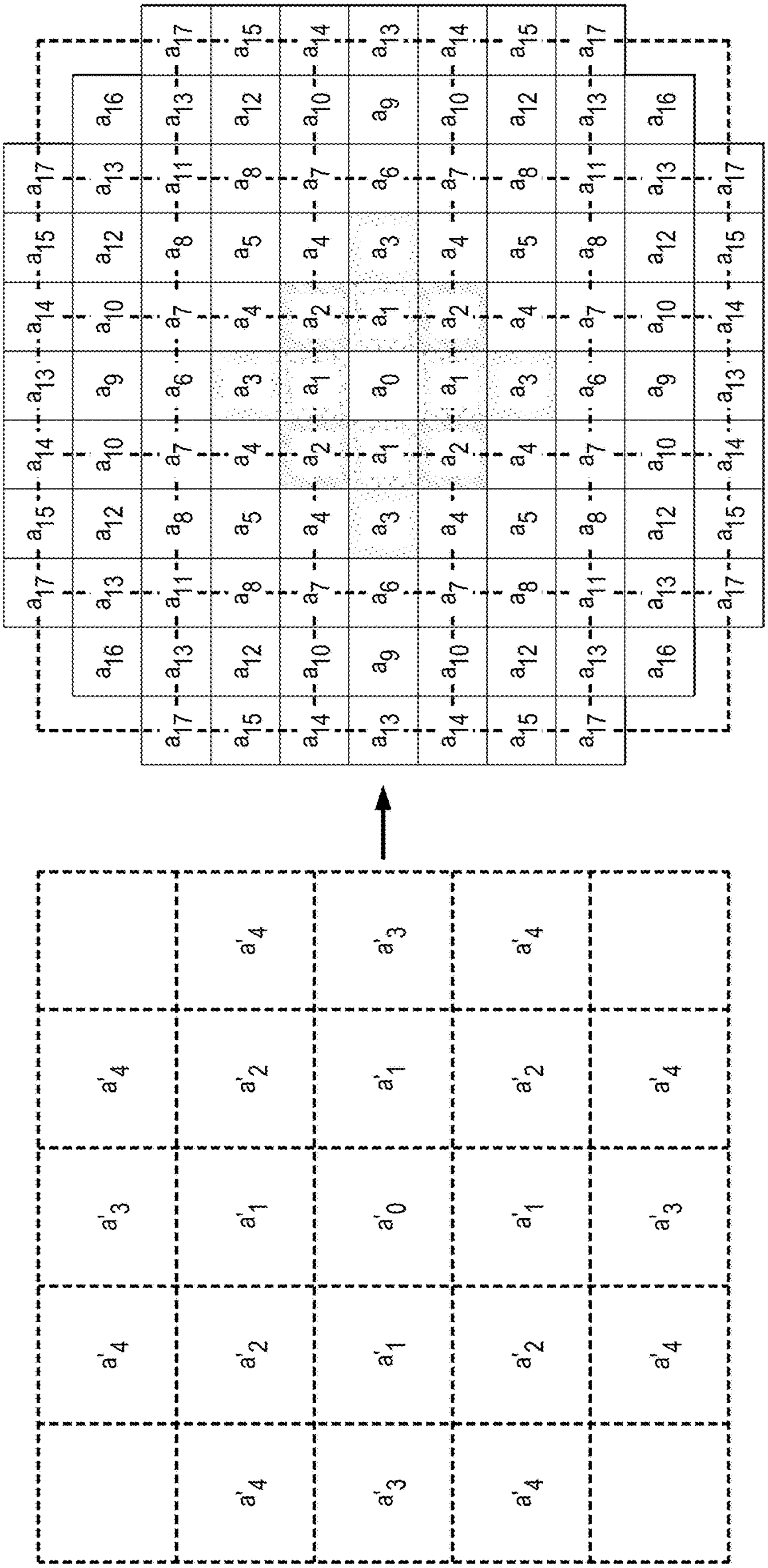
FIG. 7 illustrates an example filling of empty pixels using NNPD according to this disclosure.
Figure 8:
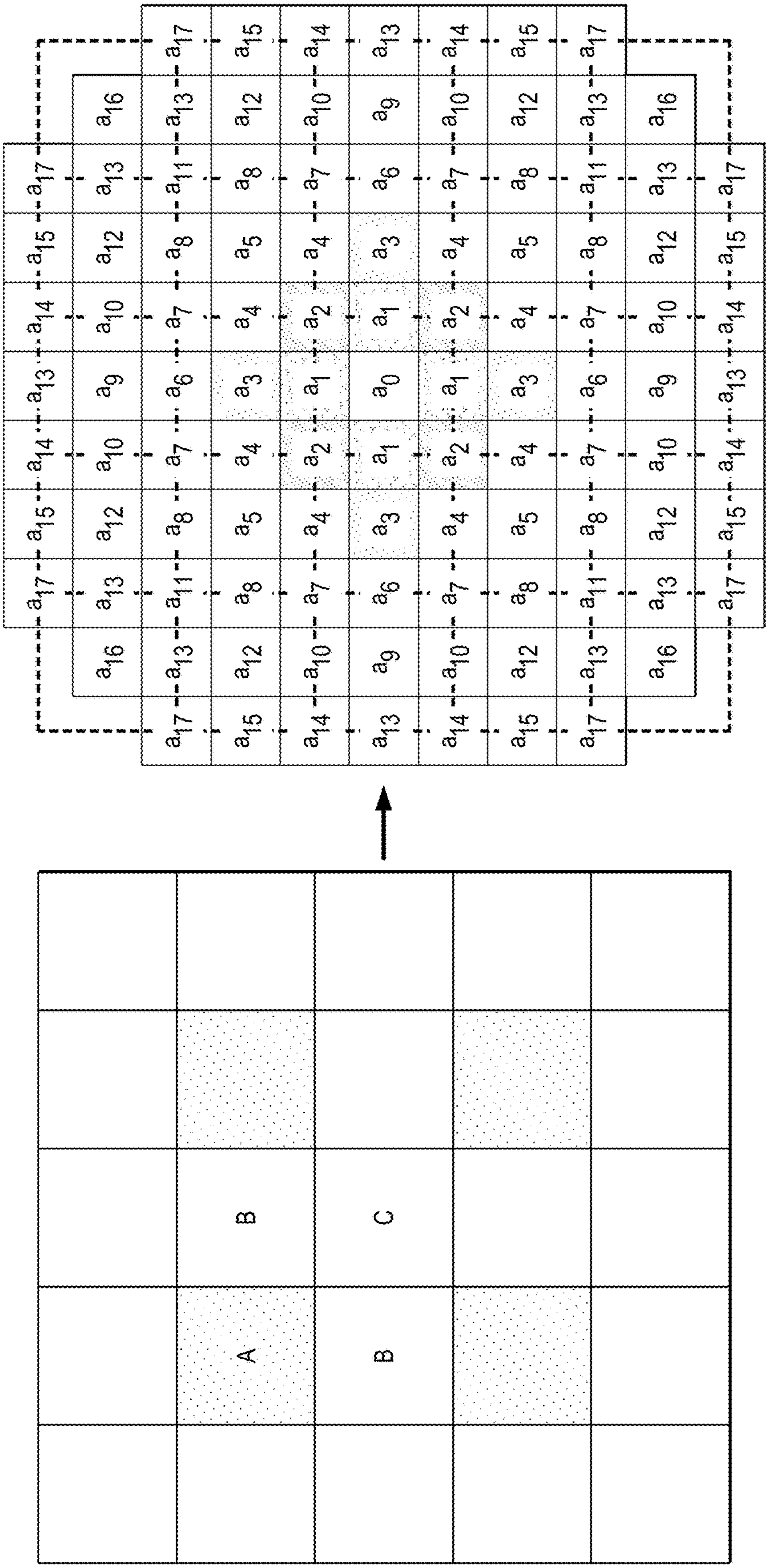
FIG. 8 illustrates an example filling of empty pixels to a subpixel level using NNPD according to this disclosure.

Image pixels of the input image are shrunk to a subpixel level in order to form a sparse pixel image including many empty pixels at step 208. This may include, for example, the processing system 106 shrinking the pixels to $1/N \times 1/N$ size (where N is a positive integer) of an original pixel. One example of shrinking image pixels is shown in FIG. 4, which is described below. The empty pixels are filled using a formula to generate a new filled sparse subpixel image including the previously-shrunk pixels and the filled subpixels at step 210. Examples of filling empty pixels are shown in FIGS. 5, 7, and 8, which are described below. Nearest neighbor pixel deconvolution (NNPD) is applied to the subpixel PSF and filled sparse subpixel image in order to increase the resolution of the new image at step 212. One example of applying NNPD is shown in FIG. 6, which is described below. The new high-resolution subpixel image is provided for display or other use at step 214.

Although FIG. 2 illustrates one example of a process 200 for applying enhanced image resolution to subpixels within image data using NNPD, various changes may be made to FIG. 2. For example, while shown as a series of steps, various steps in FIG. 2 may overlap, occur in parallel, occur in a different order, or occur any number of times.

Figure 3:
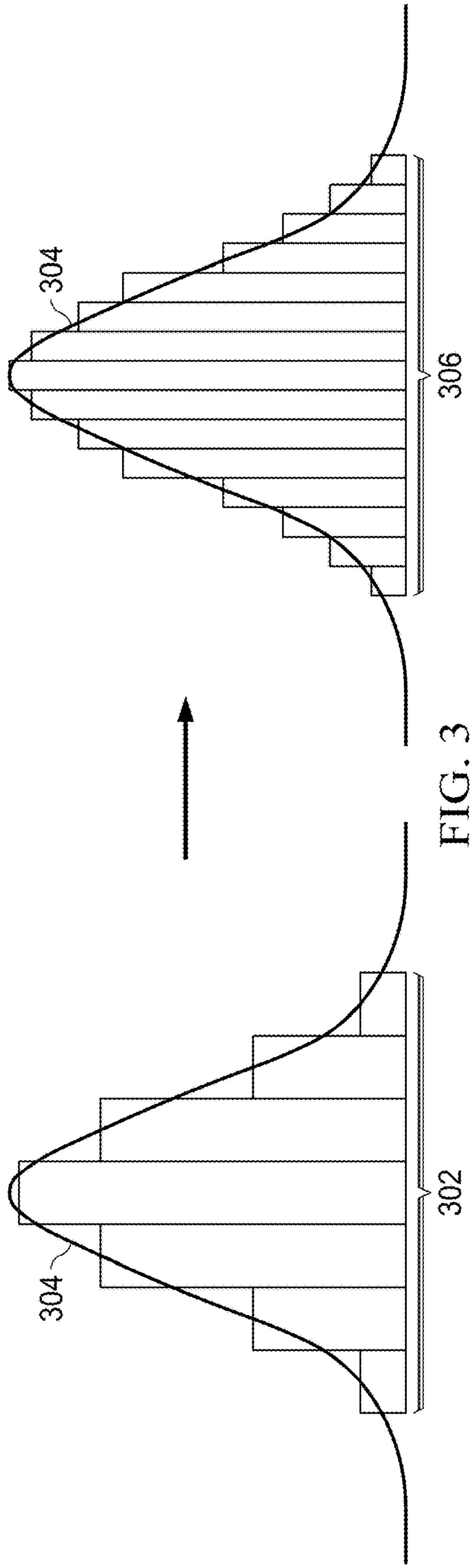
FIG. 3 illustrates an example smoothing of point spread function (PSF) data that is used to generate a PSF for subpixel images according to this disclosure.

FIG. 3 illustrates an example smoothing of PSF data that is used to generate a PSF for subpixel images according to this disclosure. For instance, the example smoothing of PSF data may be performed as part of steps 204 and 206 in the process 200 of FIG. 2. As shown in FIG. 3, PSF data is represented by bars 302 and is used to determine a continuous smoothing function 304. The PSF values represented by the bars 302 can be determined from the larger-pixel input image. The smoothing function 304 can be applied to determine the PSF values for subpixels, which are represented as bars 306. Each of the bars 306 represents a different subpixel PSF value that is calculated using the smoothing function 304.

FIG. 4 illustrates an example shrinkage of image pixels to generate a sparse image according to this disclosure. For instance, the example shrinkage of image pixels may be performed as part of step 208 in the process 200 of FIG. 2. As shown in FIG. 4, the representation on the left illustrates a pixel array 402 as a 3×3 array of pixels. Larger squares 404 represent the original pixel size of image pixels from image data prior to shrinking the pixels. Interior boxes 406 represent the size of the image pixels after they have been shrunk. Thus, as an example, the pixel represented by box 404*a* is shrunk to the size represented by box 406*a*. This can occur for each of the pixels within the pixel array 402. Once each of the pixels has been shrunk, a sparse subpixel image 410 can include the previously-shrunken pixels having pixel values associated therewith that are separated by empty pixels within areas 412 that have no pixel values associated therewith. This causes the image 410 to represent a sparse image.

In this example, each of the pixels is reduced to a ½× ½ size while maintaining its value and position. In this configuration, only one quarter of the pixels within the sparse subpixel image 410 may have values associated therewith, while three quarters of the pixels may remain empty and have no values associated therewith. It will be appreciated by one skilled in the art that the amount in which the pixels are reduced may represent any other suitable percentage of the original pixel size. Also, this represents only one example technique for building a sparse subpixel image 410, and other techniques may be utilized to build the sparse subpixel image 410.

FIG. 5 illustrates an example filling of empty pixels within a sparse image according to this disclosure. For instance, the example filling of empty pixels may be performed as part of step 210 in the process 200 of FIG. 2. As shown in FIG. 5, once the sparse subpixel image 410 has been created, the empty pixels within the sparse subpixel image 410 can be filled with image data. In this example, there are three types of pixels within the sparse subpixel image 410. Pixel A 502 has a value associated therewith as it represents a pixel value provided from a shrunken pixel originally included in the image data. Pixel B 504 and pixel C 506 are empty pixels. Pixel B 504 has two adjacent pixels 502 with known pixel values, while pixel C 506 has no adjacent pixels with known values.

In some embodiments, the pixel value for each of pixel B 504 and pixel C 506 may be generated using the following equation.

$$I'_{ij} = \begin{cases} I'_{ij} = I_{ij};\ \text{if}\ \ I_{ij}\ != 0 \\ (I_{i-1,j} + I_{i-1,j} + I_{i,j-1} + I_{i,j+1})/2;\ \text{if}\ \ Iij > 0\ \ \&\ (I_{i-1,j}\ != 0\ \ \&\ I_{i-1,j}\ != 0)\ \text{or}\ (I_{i,j-1}\ != 0\ \ \&\ I_{i,j+1}\ != 0) \\ (I_{i-1,j-1} + I_{i-1,j+1} + I_{i-1,j-1} + I_{i+1,j+1})/4;\ \text{if}\ \ I_{ij} = 0\ \ \&\ ((I_{i-1,j-1} = 0\ \ \&\ I_{i-1,j+1} = 0\ \&I_{i-1,j-1} = 0\ I_{i+1,j+1} = 0)) \end{cases}$$

Note, however, that this is only one example, and other techniques and equations may be used for filling the empty pixels. Once a value for each of the empty pixels 504 and 506 has been determined, these may be used within the sparse subpixel image 410 to fill in the pixel values within the sparse subpixel image 410.

FIG. 6 illustrates an example NNPD processing technique according to this disclosure. For instance, the example NNPD processing may be performed as part of step 212 in the process 200 of FIG. 2. As shown in FIG. 6, an NNPD model may be applied to an image having each of its pixel values filled in, such as the sparse subpixel image 410 after filling in the pixel values as done in FIG. 5. In some embodiments, the NNPD model may be defined as follows.

$$I^d = I^o * PSF \text{ in Fourier domain } F^d = F^o \cdot \Delta \text{ or } F^0 = F^d/\Delta$$

Additional details regarding the use of NNPD are described in U.S. Pat. No. 7,912,307, which is hereby incorporated by reference in its entirety. The following presents a general overview of how NNPD can be used here.

Using the NNPD model, pixels can be regrouped with respect to their distance from a center PSF pixel $a_0$. In some cases, this can be expressed as follows.

$$I^d_{jk} = a_0 I^0_{jk} + a_1 \sum_1^{N_1} (\text{1st\_nearest\_neighbor}) + a_2 \sum_1^{N_2} (\text{2nd\_nearest\_neighbor}) + + a_p \sum_1^{N_p} (\text{pth\_nearest\_neighbor}) + \cdots$$

Here, $a_0$, $a_1$, $a_2$, . . . are called the neighbor pixel correlation coefficients (NPCCCs). These values can be used to define the following.

$$PSF = a_0\delta_{i,j} + a_1(\delta_{i,j+1} + \delta_{i,j-1} + \delta_{i+1,j} + \delta_{i-1,j,}) + a_2(\delta_{i+1,j+1} + \delta_{i+1,j-1} + \delta_{i-1,j=1} + \delta_{i-1,j-1}) + \cdots$$

Here, $\delta_{i,j}$, $\delta_{i,j+1}$, . . . are Kronecker delta functions. A Fourier transform can be defined as follows.

$$\text{Object: } F^0_{lm} = \frac{1}{N}\sum_{j=0}^{N-1}\sum_{k=0}^{N-1} I^0_{jk}\, e^{-2\pi i\frac{(jl+km)}{N}}$$

$$\text{Detector: } F^d_{lm} = \frac{1}{N}\sum_{j=0}^{N-1}\sum_{k=0}^{N-1} I^d_{jk}\, e^{-2\pi i\frac{(jl+km)}{N}}$$

Using the Shift theorem of the Fourier transform, the following can be obtained.

$$\text{if } F(\{x_n\})_k = X_k$$

$$\text{then } F(\{x_{n-m}\})_k = X_k\, e^{-2\pi i\frac{km}{N}}$$

The Fourier transform of PSF can therefore be expressed as follows.

$$\Delta_{lm} = \left[a_0 + a_1\left(e^{\frac{2\pi im}{N}} + e^{\frac{-2\pi im}{N}} + e^{\frac{2\pi il}{N}} + e^{\frac{-2\pi il}{N}}\right) + a_2\left(e^{2\pi i\frac{(l+m)}{N}} + e^{-2\pi i\frac{(l+m)}{N}} + e^{2\pi i\frac{(l-m)}{N}} + e^{-2\pi i\frac{(l-m)}{N}}\right) + \ldots\right]$$

$$\text{or: } \Delta_{lm} = \left\{a_0 + 2a_1\left(\cos\frac{2\pi m}{N} + \cos\frac{2\pi l}{N}\right) + 2a_2\left[\cos\frac{2\pi(l+m)}{N} + \cos\frac{2\pi(l-m)}{N}\right] + \ldots\right\}$$

In other embodiments, the NNPD model may be defined as follows.

$$I^d = I^o * PSF \text{ in Fourier domain } F^d = F^o \cdot \Delta$$

From this, the following can be obtained.

$$\Delta_{lm} = \left\{a_0 + 2a_1\left(\cos\frac{2\pi m}{N} + \cos\frac{2\pi l}{N}\right) + 2a_2\left[\cos\frac{2\pi(l+m)}{N} + \cos\frac{2\pi(l-m)}{N}\right] + \ldots\right\}$$

$$F^d_{lm} = F^0_{lm}\left[a_0 + a_1\left(e^{\frac{2\pi im}{N}} + e^{\frac{-2\pi im}{N}} + e^{\frac{2\pi il}{N}} + e^{\frac{-2\pi il}{N}}\right) + a_2\left(e^{2\pi i\frac{(l+m)}{N}} + e^{-2\pi i\frac{(l+m)}{N}} + e^{2\pi i\frac{(l-m)}{N}} + e^{-2\pi i\frac{(l-m)}{N}}\right) + \cdots\right]$$

$$\text{or } F^0_{lm} = F^d_{lm}/\left[a_0 + 2a_1\left(\cos\frac{2\pi m}{N} + \cos\frac{2\pi l}{N}\right) + 2a_2\left[\cos\frac{2\pi(l+m)}{N} + \cos\frac{2\pi(l-m)}{N}\right] + \ldots.\right]$$

By applying an inverse Fourier Transform to the above, a pixel of a recovered object image $$I^0_{jk}$$

can be expressed as follows.

$$I^0_{jk} = \frac{1}{N}\sum_{l=0}^{N-1}\left(\sum_{m=0}^{N-1}\frac{F^d_{lm}}{\Delta_{lm}}e^{2\pi i\frac{(jl+km)}{N}}\right)$$

Here:

$$\Delta_{lm} = a_0 + a_1 \cdot 2\left[\cos\left(\frac{2\pi l}{N}\right) + \cos\left(\frac{2\pi m}{N}\right)\right] + a_2 \cdot 2\left[\cos\left(2\pi\frac{l+m}{N}\right) + \cos\left(2\pi\frac{l-m}{N}\right)\right] +$$

The above equation for $$I^0_{jk}$$

can represent the final form of an enhanced image determined using the NNPD model.

FIG. 7 illustrates an example filling of empty pixels using NNPD according to this disclosure. For instance, the example filling of empty pixels may be performed as part of step 210 in the process 200 of FIG. 2. As shown in FIG. 7, the empty pixels of an image may be filled in the following manner.

$$a_0' = a_0 + 2 * a_1 + a_2$$

$$a_1' = a_3 + a_4 + (a_1 + a_7 + a_6 + a_2)/2$$

$$a_2' = a_5 + (a_4 + a_8 + a_7)/2 + (a_2 + a_{11})/4$$

$$a_3' = a_9 + a_{10} + (a_{13} + a_6 + a_{14} + a_7)/2$$

$$a_4' = a_{12} + (a_8 + a_{10} + a_{13} + a_{15})/2 + (a_7 + a_{11} + a_{14} + a_{17})/4$$

FIG. 8 illustrates an example filling of empty pixels to a subpixel level using NNPD according to this disclosure. For instance, the example filling of empty pixels may be performed as part of step 210 in the process 200 of FIG. 2. As shown in FIG. 8, another method for filling empty pixels can use PSF of the nearest neighbor pixel model. As discussed previously with respect to FIG. 5, pixel A 502 can have a value, while pixels B and C 504 and 506 are empty pixels. Pixel B 504 has two adjacent pixels with values, and pixel C 506 has no adjacent pixel with value. From PSF of the nearest neighbor pixel model, if $I_{ij}=a_0$, its adjacent pixels$=a_1$, and its diagonal pixels$=a_2$. Pixel values can be generated in the following manner.

$$I_{ij}' = I_{ij} + (I_{i-1,j} + I_{i-1,j} + I_{i,j-1} + I_{i,j+1}) * a_1/(a_0 * 2) + (I_{i-1,j-1} + I_{i-1,j+1} + I_{i-1,j-1} + I_{i+1,j+1}) * a_2/(a_0 * 4)$$

Although FIGS. 3 through 8 illustrate examples of how certain steps in the process 200 of FIG. 2 may be implemented, various changes may be made to FIGS. 3 through 8. For example, each of the steps in the process 200 of FIG. 2 may be implemented in any other suitable manner, such as by using different equations that those provided above.

Figure 9:
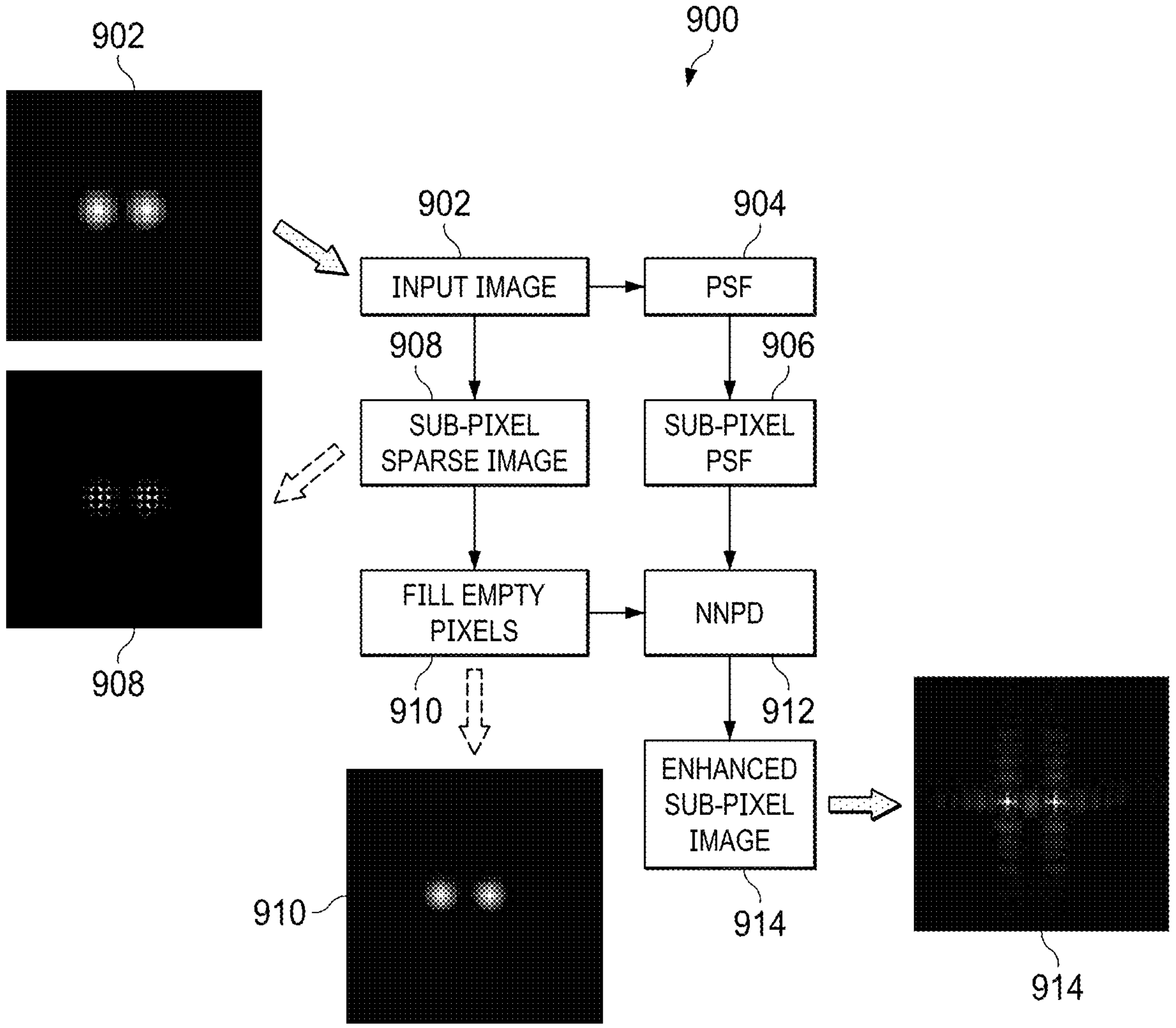
FIG. 9 illustrates an example process for generating an enhanced subpixel image according to this disclosure.

FIG. 9 illustrates an example process 900 for generating an enhanced subpixel image according to this disclosure. More specifically, the process 900 can be used to generate an enhanced subpixel image 914 from an input image 902. As shown in FIG. 9, the input image 902 can be processed to determine its PSF data 904. The PSF data 904 can be converted to subpixel PSF data 906 using the smoothing function as described above. The input image 902 can also be used to create a subpixel sparse image 908 by reducing the size of the pixels within the input image 902. The subpixel sparse image 908 can be processed to fill in the empty pixels within the subpixel sparse image 908 during a fill operation 910 as described above. The filled subpixel sparse image and the subpixel PSF data 906 can be processed during an NNPD operation 912 in order to generate the enhanced subpixel image 914. In various embodiments, the enhanced subpixel image thus generated has an increased resolution. In some such embodiments, the enhanced image can have spatial resolution beyond the diffraction limit.

Although FIG. 9 illustrates one example of a process 900 for generating an enhanced subpixel image, various changes may be made to FIG. 9. For example, various steps in FIG. 2 may overlap, occur in parallel, occur serially, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for providing enhanced subpixel resolution, the method comprising:

obtaining point spread function (PSF) data associated with an input image;

determining subpixel PSF data from the PSF data;

generating a filled subpixel sparse image from pixels of the input image; and applying nearest neighbor pixel deconvolution (NNPD) to the subpixel PSF data and the filled subpixel sparse image to generate an enhanced subpixel image having an increased resolution.

2. The method of claim 1, wherein determining the subpixel PSF data comprises:

determining a smoothing function for the PSF data; and determining the subpixel PSF data for each subpixel responsive to the smoothing function.

3. The method of claim 2, wherein determining the smoothing function comprises:

determining the PSF data associated with each pixel in the input image; and determining the smoothing function from the PSF data associated with each pixel.

4. The method of claim 1, wherein generating the filled subpixel sparse image comprises:

shrinking the pixels of the input image by a predetermined amount to create a subpixel sparse image; and generating pixel values in portions of the subpixel sparse image having no values associated therewith.

5. The method of claim 4, wherein the subpixel sparse image includes a first group of pixels have values associated therewith and a second group of pixels have no values associated therewith.

6. The method of claim 4, wherein generating the pixel values comprises generating the pixel values responsive to a number of adjacent values having a pixel value associated therewith.

7. The method of claim 4, wherein shrinking the pixels of the input image comprises shrinking the pixels to $1/N \times 1/N$ size of an original pixel.

8. The method of claim 1, further comprising displaying the enhanced subpixel image having the increased resolution.

9. A system for providing enhanced subpixel resolution, the system comprising:

an imaging system configured to capture an input image, the input image associated with point spread function (PSF) data; and at least one processing device configured to:

obtain the input image and the PSF data;

determine subpixel PSF data from the PSF data;

generate a filled subpixel sparse image from pixels of the input image; and apply nearest neighbor pixel deconvolution (NNPD) to the subpixel PSF data and the filled subpixel sparse image to generate an enhanced subpixel image having an increased resolution.

10. The system of claim 9, wherein the at least one processing device is further configured to:

determine a smoothing function for the PSF data; and determine the subpixel PSF data for each subpixel responsive to the smoothing function.

11. The system of claim 10, wherein the at least one processing device is further configured to:

determine the PSF data associated with each pixel in the input image; and determine the smoothing function from the PSF data associated with each pixel.

12. The system of claim 9, wherein the at least one processing device is further configured to:

shrink the pixels of the input image by a predetermined amount to create a subpixel sparse image; and generate pixel values in portions of the subpixel sparse image having no values associated therewith.

13. The system of claim 12, wherein the subpixel sparse image includes a first group of pixels having values associated therewith associated with shrunken pixel values and a second group of pixels having no values associated therewith.

14. The system of claim 12, wherein the subpixel sparse image includes a first group of pixels have values associated therewith and a second group of pixels have no values associated therewith.

15. The system of claim 12, wherein the at least one processing device is configured to shrink the pixels to $1/N \times 1/N$ size of an original pixel.

16. The system of claim 9, further comprising a display configured to display the enhanced subpixel image having the increased resolution.

17. A non-transitory machine readable medium containing instructions that when executed cause at least one processor to:

obtain point spread function (PSF) data associated with an input image;

determine subpixel PSF data from the PSF data;

generate a filled subpixel sparse image from pixels of the input image; and apply nearest neighbor pixel deconvolution (NNPD) to the subpixel PSF data and the filled subpixel sparse image to generate an enhanced subpixel image having an increased resolution.

18. The non-transitory machine readable medium of claim 17, further containing instructions that when executed cause the at least one processor to:

determine a smoothing function for the PSF data; and determine the subpixel PSF data for each subpixel responsive to the smoothing function.

19. The non-transitory machine readable medium of claim 18, further containing instructions that when executed cause the at least one processor to:

determine the PSF data associated with each pixel in the input image; and determine the smoothing function from the PSF data associated with each pixel.

20. The non-transitory machine readable medium of claim 17, further containing instructions that when executed cause the at least one processor to:

shrink the pixels of the input image by a predetermined amount to create a subpixel sparse image; and generate pixel values in portions of the subpixel sparse image having no values associated therewith.

* * * * *